UNITED STATES PATENT OFFICE.

JAMES THAME, OF TWICKENHAM, ENGLAND.

COMPOSITION OF MATTER FOR THE MANUFACTURE OF WALL DECORATIONS OR THE LIKE.

SPECIFICATION forming part of Letters Patent No. 717,944, dated January 6, 1903.

Application filed May 21, 1901. Serial No. 61,303. (No specimens.)

*To all whom it may concern:*

Be it known that I, JAMES THAME, a subject of the King of Great Britain and Ireland, residing at Twickenham, in the county of Middlesex, England, have invented a new and useful Composition of Matter for the Manufacture of Wall Decorations or the Like, (for which I have made application for Letters Patent in Great Britain, under No. 19,399, dated October 30, 1900,) of which the following is a specification.

This invention relates to an improved composition of matter for the manufacture of wall decoration and the like, and has for its object the production of a waterproof material initially in a plastic condition which can be readily impressed with a pattern and afterward become dry and hard, so as to retain the character of its impressed surface.

I am aware that compositions have been made from oxidized linseed and other oils incorporated with a filling medium; but the waste involved in the manufacture of such material is very large, owing to the impossibility of using up the waste material or trimmings by again working such up with fresh material. Consequently the price of the finished product is increased in proportion to the waste which occurs in the manufacture. My invention entirely overcomes these difficulties, as any trimmings or surplus materials which may be produced in the course of manufacture can be readily worked up afresh with new ingredients with great facility and without reducing the quality of the resulting product.

To carry my invention into effect, I use as the base of my composition the gum of the plant botanically known as the "*Dyera costulata.*" The said gum is known commercially under the names of "Fluvia" or "Pontianak." I take this gum and I thoroughly mix and incorporate with it under heat a binding material—such as the waste soft fiber from cotton, jute, hemp, flax, or sisal—and a hardening material—such as zinc oxid, barytes, or similar white material. When a bulky product is required, such as will give high relief with little weight, I add a filling material such as wood-meal, corn-pith, paper-meal, and the like or ground leather or dissolved leather. This mixture when hot and has assumed the character of dough is passed through rolls or otherwise pressed to produce a slab or sheet having a plain or ornamental surface, according to the nature of the surfaces with which it is pressed. In this way a simple or complicated and intricate design can be produced at a very low cost. When the composition is cold, it is fairly hard and flexible. The material may be colored by means of anilin dyes or pigments introduced during the mixture of the various ingredients.

I have found the following proportions of materials give a composition generally useful for the purpose of wall decoration: gum of the *Dyera costulata,* twenty-five to thirty-five per cent.; soft cotton-fiber waste, ten to fifteen per cent.; hardening material, such as zinc oxid, sixty-five to fifty per cent.

A backing of paper, canvas, linen, or the like can be arranged to one side of the sheet or slab to give it greater strength, if necessary.

Having now described my invention, what I claim, and desire to secure by Letters Patent, is—

A composition of matter suitable as a waterproof material for wall decoration, consisting of the mixture of the gum of the *Dyera costulata,* a fibrous binding material, and a hardening material.

In witness whereof I have hereunto set my hand in presence of two witnesses.

JAMES THAME.

Witnesses:
RICHARD A. HOFFMANN,
CHARLES CARTER.